(12) United States Patent
Ge

(10) Patent No.: US 11,999,594 B2
(45) Date of Patent: Jun. 4, 2024

(54) ELEVATOR BELT MONITORING SYSTEM

(71) Applicant: Weidmüller Interface GmbH & Co. KG, Detmold (DE)

(72) Inventor: Xuefeng Ge, Henrico, VA (US)

(73) Assignee: Weidmüller Interface GmbH & Co. KG (DE)

( * ) Notice: Subject to any disclaimer, the term of this patent is extended or adjusted under 35 U.S.C. 154(b) by 111 days.

(21) Appl. No.: 17/445,779

(22) Filed: Aug. 24, 2021

(65) Prior Publication Data
US 2023/0066078 A1  Mar. 2, 2023

(51) Int. Cl.
*B66B 7/12* (2006.01)
*G01N 27/02* (2006.01)
*H01R 12/67* (2011.01)

(52) U.S. Cl.
CPC ........... *B66B 7/1223* (2013.01); *G01N 27/02* (2013.01); *H01R 12/67* (2013.01)

(58) Field of Classification Search
CPC ....... B66B 7/062; B66B 7/085; B66B 7/1223; H01R 13/71; H01R 24/00; H01R 12/67; H02G 11/006; Y10T 29/49194; G01N 27/02
See application file for complete search history.

(56) References Cited

U.S. PATENT DOCUMENTS

| 7,506,728 B2* | 3/2009 | Hawkes | H01R 4/5033 187/277 |
| 7,540,359 B2* | 6/2009 | Veronesi | H01R 12/62 187/247 |
| 8,424,653 B2* | 4/2013 | Stucky | B66B 7/1223 187/391 |
| 8,991,562 B2* | 3/2015 | Odermatt | B66B 7/062 187/393 |
| 9,254,985 B2* | 2/2016 | Nolting | B66B 7/062 |
| 2007/0173104 A1 | 7/2007 | Veronesi et al. | |
| 2020/0277162 A1 | 9/2020 | Larboulette | |
| 2021/0198083 A1 | 7/2021 | Dold | |

FOREIGN PATENT DOCUMENTS

| CN | 104426004 B | 11/2017 | |
| DE | 19747115 A1 * | 4/1999 | H01R 13/18 |
| EP | 2534082 B1 | 12/2012 | |

OTHER PUBLICATIONS

English Machine Translation of DE-19747115-A1 (Year: 1999).*

* cited by examiner

*Primary Examiner* — Giovanni Astacio-Oquendo
*Assistant Examiner* — Martin Walter Braunlich
(74) *Attorney, Agent, or Firm* — Laubscher & Fretwell, P.C.

(57) ABSTRACT

An elevator belt monitoring apparatus includes a housing for receiving an elevator belt and a plurality of screws or pins which are operable to pierce the belt and the spaced parallel cords arranged within the belt. One screw or pin engages each cord. A plurality of bridge contacts are connected with adjacent pairs of screws or pins and signal contacts are connected with the screws or pins adjacent to the outer edges of the belts. The signal contacts are connected with a monitoring device which sends and receives signals to the contacts to provide an indication of the condition or deterioration of the belt.

25 Claims, 12 Drawing Sheets

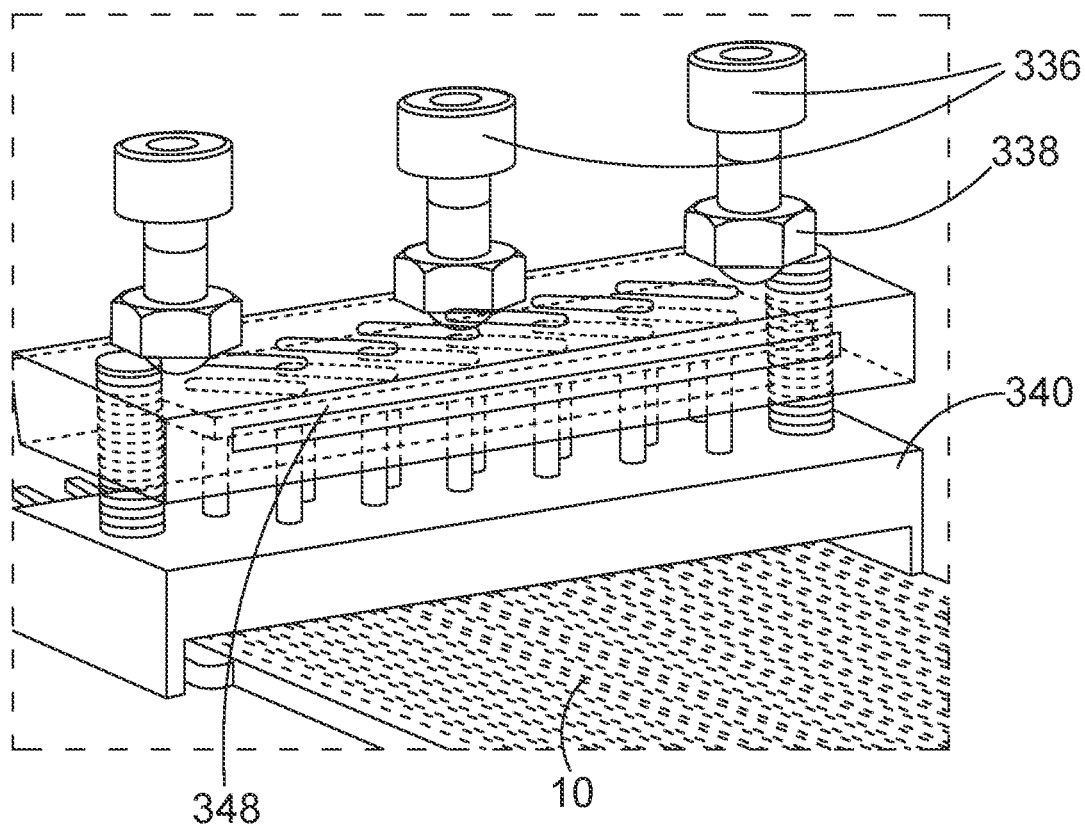
FIG. 25
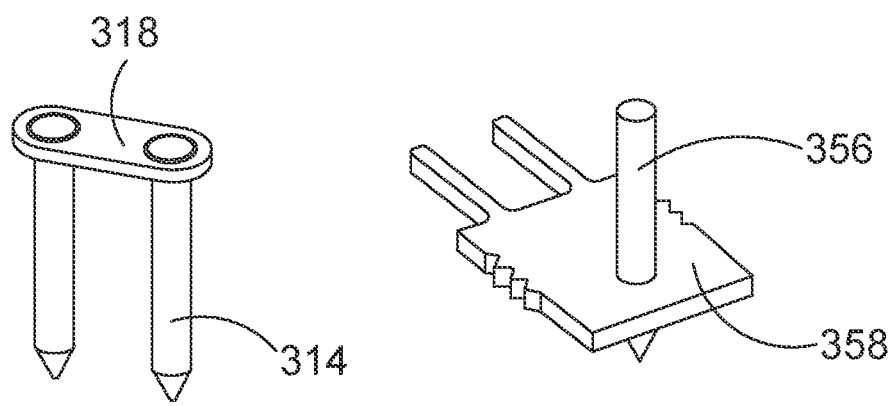
FIG. 26
FIG. 27

ELEVATOR BELT MONITORING SYSTEM

BACKGROUND OF THE INVENTION

Elevator belts are used to raise and lower an elevator car. The belts are typically formed of a flexible material such as rubber or synthetic plastic and contain a plurality of parallel strands or cords formed of metal to increase the strength of the belt. The belts typically have a rectangular cross-sectional configuration and the cords are arranged in spaced relation across the width of the belt. Through use over time, the cords deteriorate which weakens the belt. While elevator belts can be visually inspected, deterioration of the cords normally cannot be detected visually. Accordingly, electrical monitoring systems have been developed which monitor changes in the integrity of the cords within the belts. Such monitoring systems typically use connecting devices which engage the cords within the belt. An electrical signal is delivered to the cords via the connecting devices and changes in the signal are analyzed to provide an indication of deterioration of the cords.

BRIEF DESCRIPTION OF THE PRIOR ART

Elevator belt monitoring devices are known in the patented prior art as evidenced by EP 2 534 082 which discloses an elevator belt monitoring assembly including cord contacting in the nature of screws which penetrate the belt in gaps between adjacent cords so that the screws abut against adjacent cords. Adjacent screws are staggered or offset to engage different pairs of cords. Electrical conductors are connected with at least two of the screws for transmitting an electrical signal between the cords of the belt and a monitoring device.

While the prior devices operate satisfactorily, maintaining contact with the elevator cords can be difficult due to shifting of the cords and the penetrating screws over time. If the screws become separated from the cords, monitoring of the cord condition is no longer possible. The present invention was developed in order to overcome these and other drawbacks of prior elevator belt monitoring devices by providing an improved cord contact assembly.

SUMMARY OF THE INVENTION

Accordingly, it is a primary object of the invention to provide an elevator belt monitoring system in which belt-piercing devices are used to pierce through the elevator belt and through the spaced cords arranged in the belt. One piercing device is used to penetrate each cord. A plurality of contacts are connected with the belt-piercing devices. More particularly, bridge contact assemblies connect selected pairs of belt-piercing devices and signal contacts are connected with the belt-piercing devices which penetrate the outermost cord on either side of the belt. An electrical signal is delivered to the cords via the signal and bridge contacts and the signal is analyzed by a monitoring device to indicate an abnormality in the condition of the cords.

The monitoring system includes a housing for receiving an elevator belt. In one embodiment, the housing includes a bottom portion and a removable top portion, with the elevator belt being arranged in the housing bottom portion. The bottom portion contains an array of openings, preferably corresponding in number with the number of cords in the belt. A screw is arranged in each opening and is operable to penetrate the belt and pierce one of the cords.

In one embodiment, first bridge contacts are arranged in the housing top portion and configured for connection with second bridge contacts connected with the screws when the top is mounted on the housing bottom portion. In an alternate embodiment, the bridge contacts contain pairs of openings for receiving the adjacent screws being electrically connected and extend across the upper surface of the housing bottom portion. In this embodiment, the top portion contains a plurality of through openings aligned with the openings of the housing bottom portion, whereby a screwdriver can be inserted into the top portion openings to engage and operate a screw in the corresponding housing bottom opening.

According to a further embodiment, the belt-piercing devices comprise pins. A pin holding plate is arranged in the housing and contains a plurality of spaced parallel through slots. Each slot receives a pair of pins which are to be connected a bridge contact. The pin holding plate further contains a pair of openings in opposite ends of the plate for receiving end pins configured to pierce the cords at opposite ends of the elevator belt. Signal contacts are connected with the end pins. An actuator mechanism is also arranged within the housing above the pin holding plate and is operable to displace the plate and the pins against the elevator belt to drive the pins into piercing engagement with respective cords of the belt. In order to properly position the elevator belt relative to the pin holding plate, a belt holding plate is arranged in the housing adjacent an opening through which the belt is inserted into the housing. Preferably, the belt holding plate includes resilient side walls which press against edge portions of the belt to position the belt with each of the piercing pins in alignment with one of the cords within the belt.

BRIEF DESCRIPTION OF THE FIGURES

Other objects and advantages of the invention will become apparent from a study of the following description when viewed in the light of the accompanying drawing, in which:

FIG. 25 is a front perspective view of a piercing pin actuator assembly of the monitoring apparatus of FIG. 21 with the housing removed;

FIGS. 26 and 27 are perspective views of belt piercing pins of the monitoring apparatus of FIG. 21 with a bridge contact and a signal contact, respectively, connected therewith.

DETAILED DESCRIPTION

Figure 1:
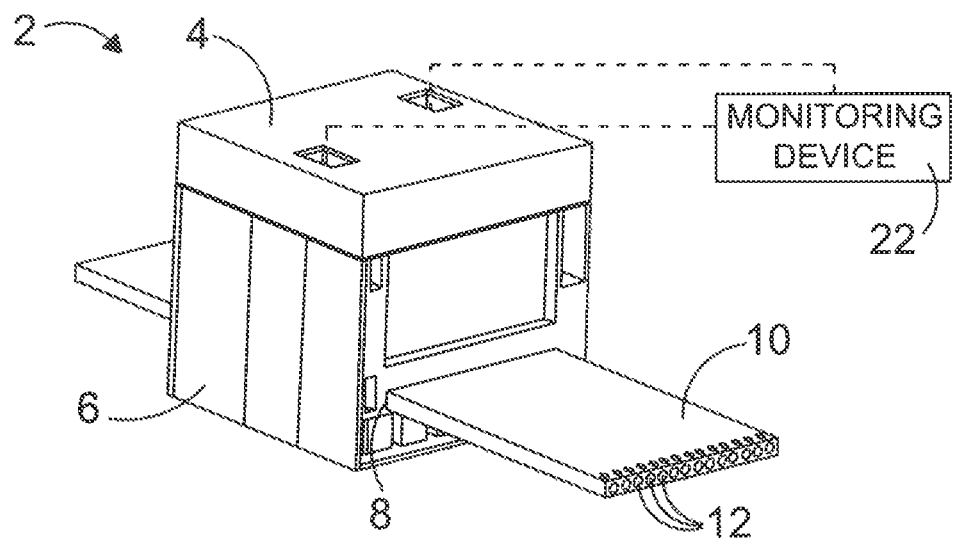
FIG. 1 is a front perspective view of an elevator belt monitoring apparatus according to a first embodiment of the invention.
Figure 2:
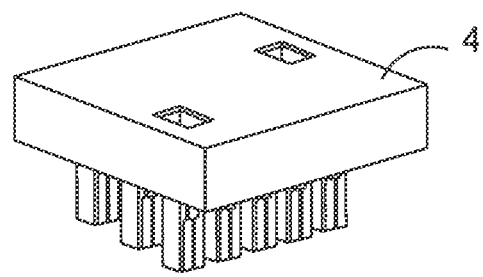
FIGS. 2 and 3 are perspective views of the top and bottom portions, respectively, of a housing of the monitoring apparatus of FIG. 1.
Figure 3:
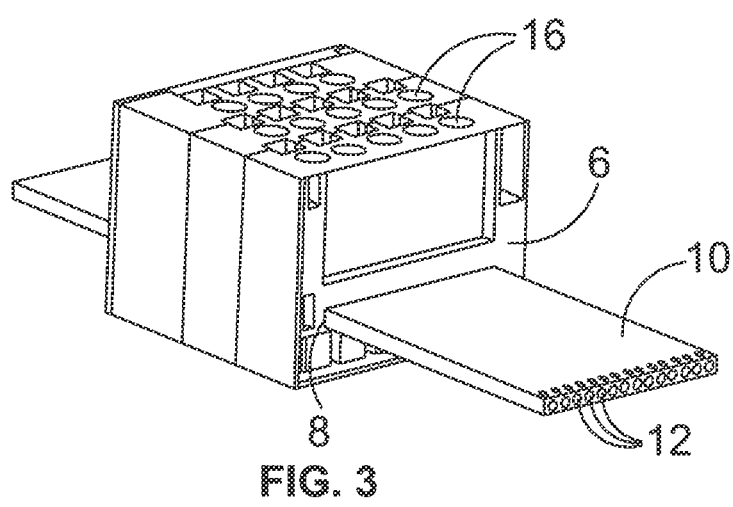
Figure 4:
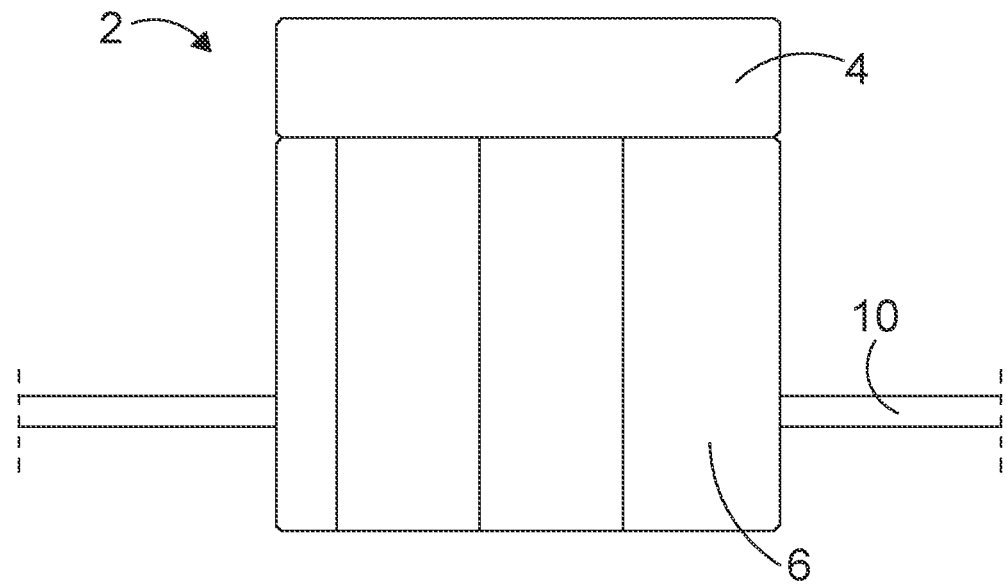
FIGS. 4 and 5 are side plan and side sectional views, respectively of the housing of the monitoring apparatus of FIG. 1 with an elevator belt and belt-piercing devices arranged therein.

Referring to FIGS. 1-11, a first embodiment of an elevator belt monitoring apparatus according to the invention will be described. The apparatus includes a housing 2 having a top portion 4 which is removably connected with a bottom portion 6. The bottom portion contains a longitudinal through slot 8 which is configured to receive an elevator belt 10. The belt has a generally rectangular cross-sectional configuration and is formed of a durable flexible material such as rubber or other suitable synthetic material and contains a plurality of longitudinal cords 12 generally arranged in spaced relation across the width of the belt. The cords are typically formed of a woven, twisted or braided strands which are formed of a durable material such as metal and serve to reinforce the belt.

Figure 5:
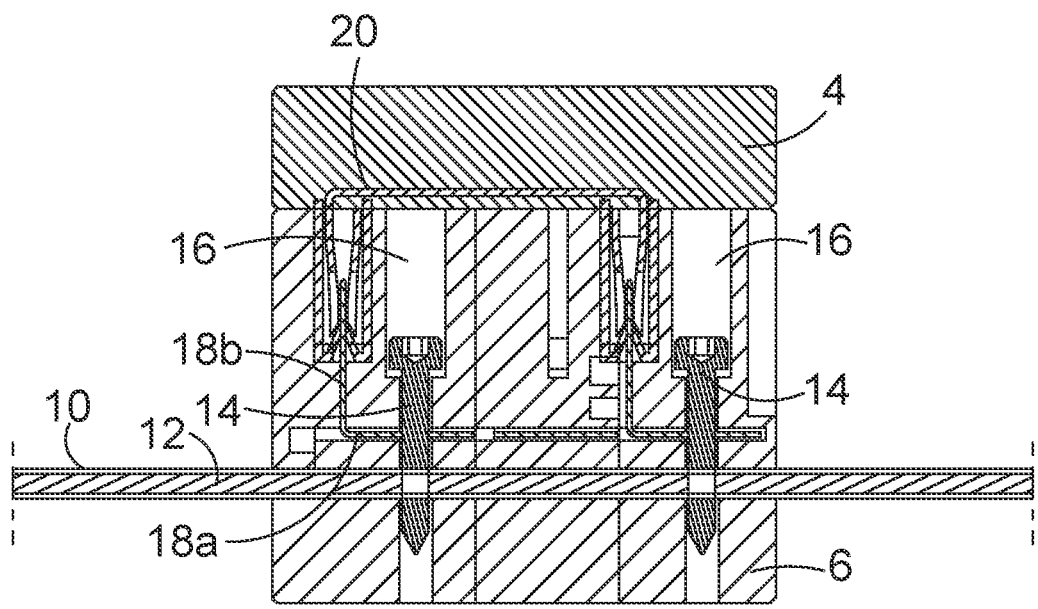
Figure 8:
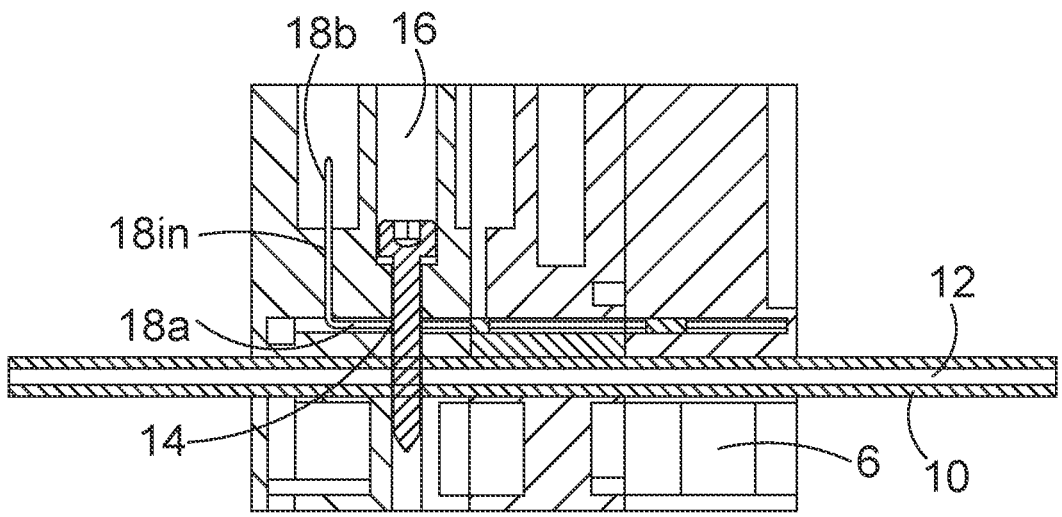
FIGS. 8 and 9 are side and front sectional views, respectively, of the bottom portion of the housing of the monitoring apparatus of FIG. 1 showing piercing screws engaged with the cords of an elevator belt.
Figure 9:
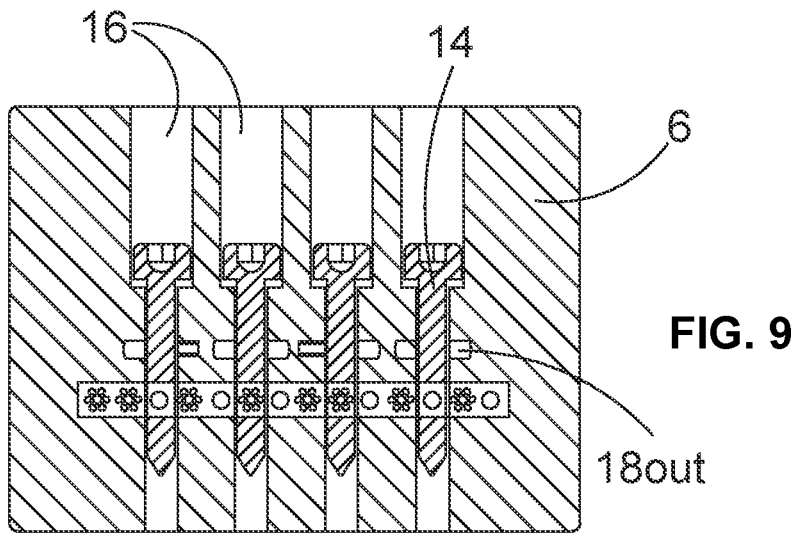
Figure 10:
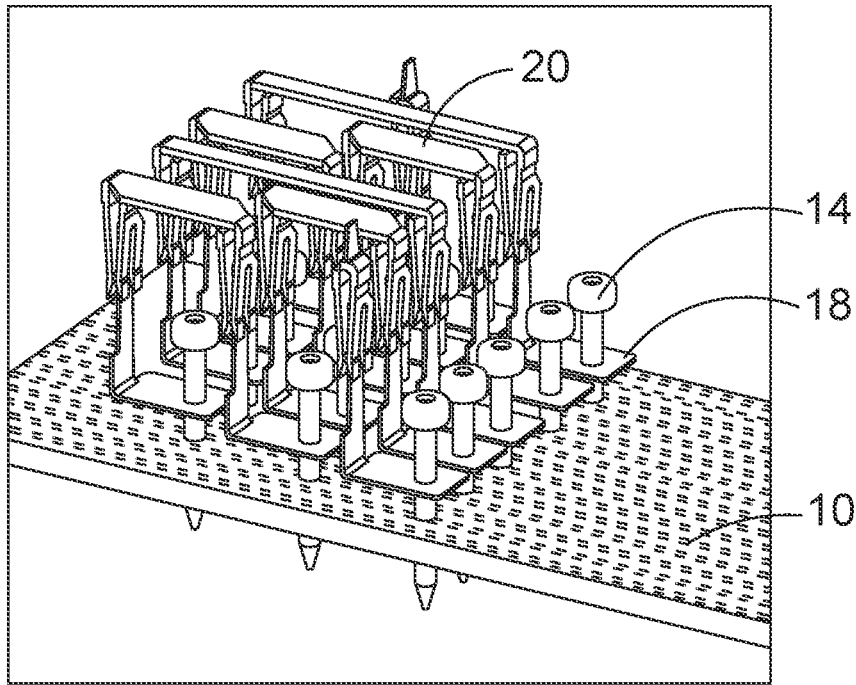
FIGS. 10 and 11 are top and bottom perspective views, respectively, of the piercing screws and bridge and signal contacts with the housing portions removed for the monitoring apparatus of FIG. 1.
Figure 11:
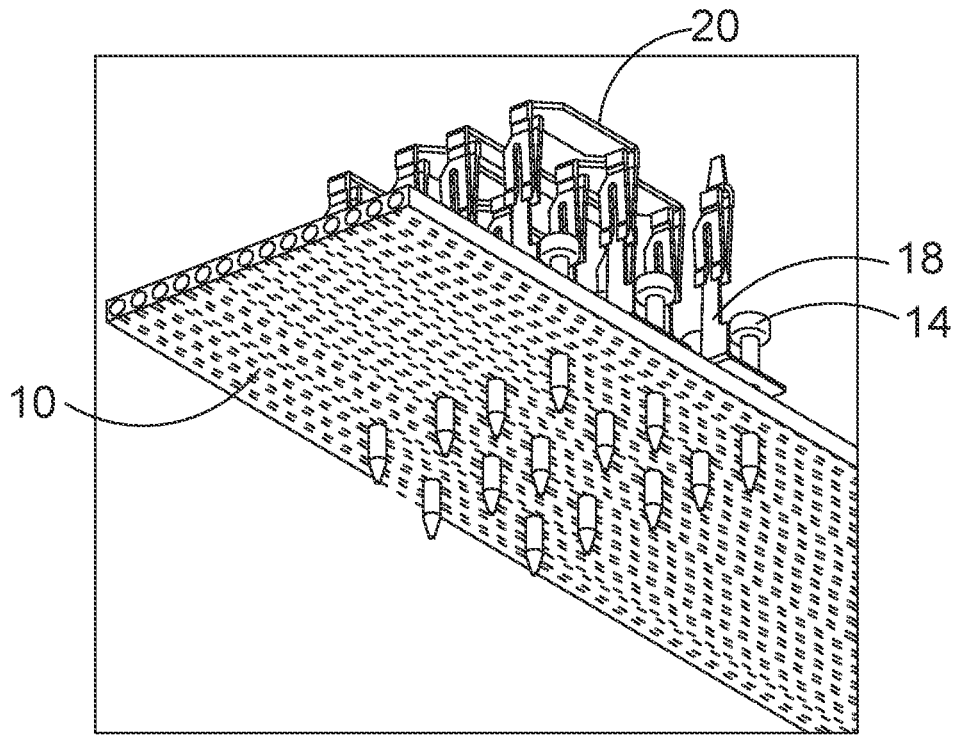
Figure 12:
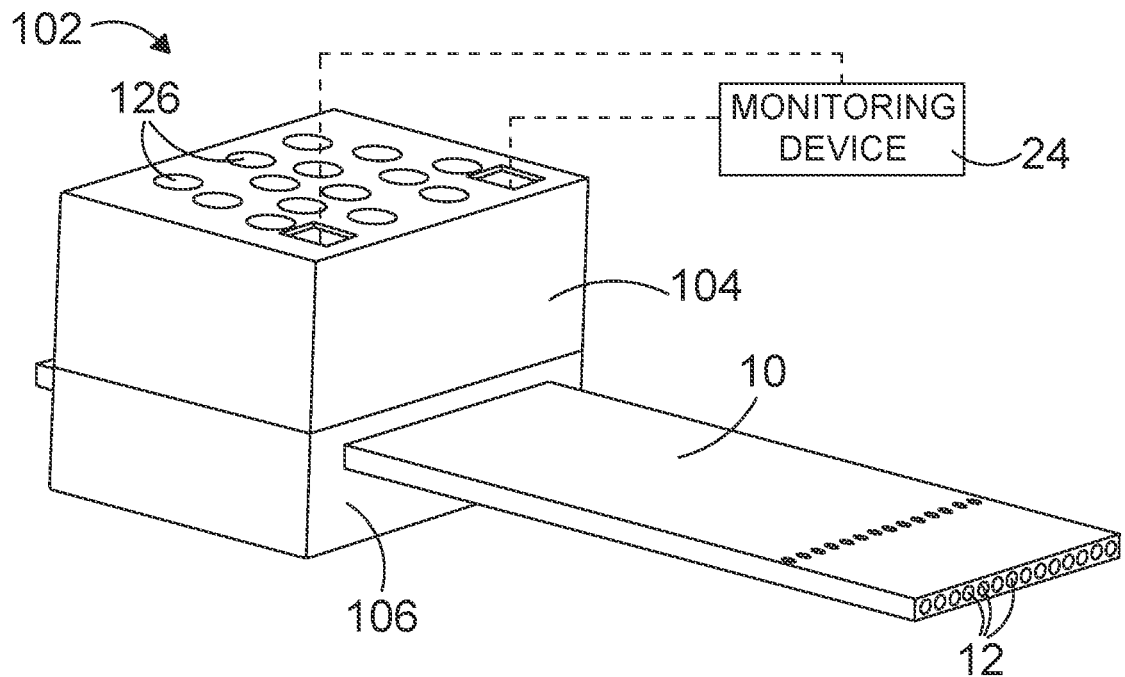
FIG. 12 is a front perspective view of an elevator belt monitoring apparatus according to a second embodiment of the invention.
Figure 13:
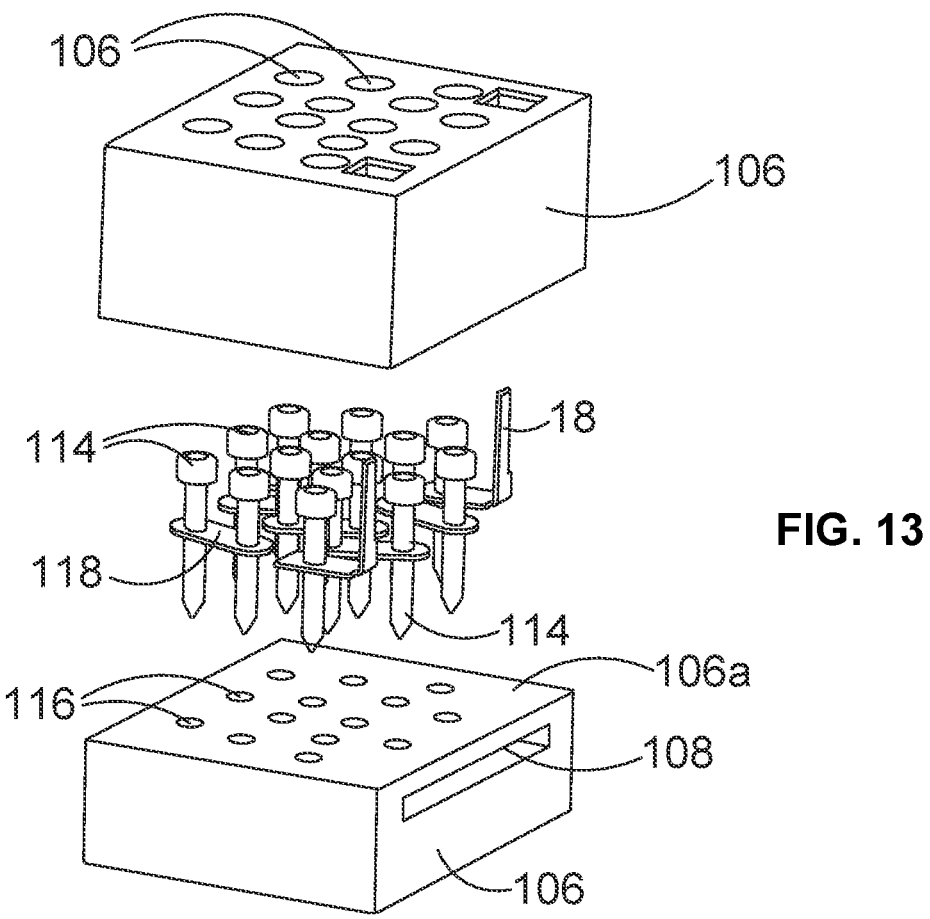
FIG. 13 is an exploded perspective view of the monitoring apparatus of FIG. 12.
Figure 14:
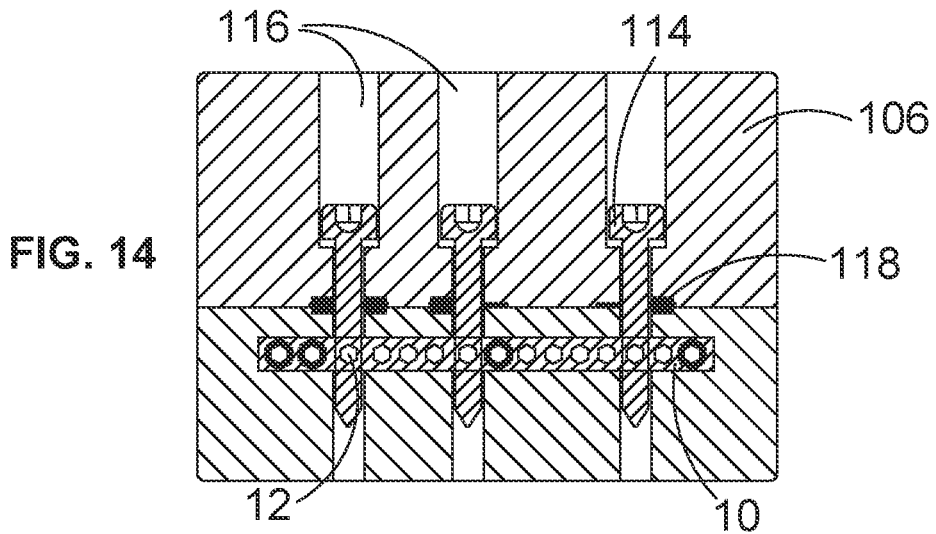
FIG. 14 is a front sectional view of the bottom portion of the housing of the monitoring apparatus of FIG. 12 showing piercing screws engaged with the cords of an elevator belt.

As shown in FIG. 5, a plurality of belt piercing devices in the form of screws 14 are arranged within the housing bottom portion 6. More particularly, the housing bottom portion contains a plurality of openings 16, one for each screw, which are arranged in an array as shown in FIGS. 10 and 11, with each opening and the associated screw being aligned with a different cord of the belt. With the top portion of the housing removed, a screwdriver (not shown) can be inserted into each opening to engage a head of each screw and rotate each screw and drive it downwardly through the belt into each cord, respectively. The screws thus penetrate the cords and are lodged therein as shown in FIGS. 5, 8, and 9. The screws are made of an electrically conductive material such as metal and thus are both physically and electrically connected with the cords.

A plurality of contacts are connected with the screws. The contacts are also formed of metal and thus are electrically as well as mechanically connected with the screws. In the embodiment shown in FIG. 6, each contact 18 has an L-shaped configuration and includes a first planar portion 18a containing an opening which is configured to receive a screw and a second planar portion 18b arranged normal to the first planar portion. The contacts are pre-arranged in the housing bottom portion as shown in FIG. 5 with the openings in the first planar portion 18a aligned with the openings 16 to receive respective screws. The second planar portion extends upwardly in the housing bottom portion. The housing top portion 4 contains a plurality of bridge contacts 20. The bridge contacts include a planar portion 20a and end connector portions 20b arranged normal to the planar portion. The bridge contact end portions are configured for connection with respective second planar portions 18b of adjacent screws as shown in FIG. 10, with the joined screws piercing adjacent cords.

Figure 6:
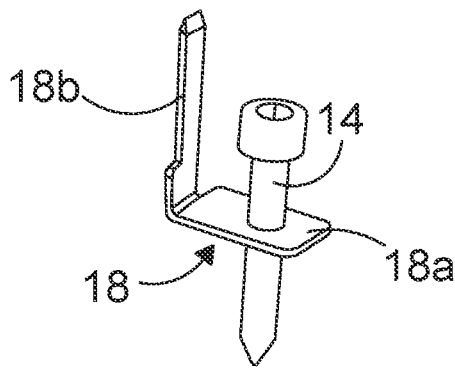
FIGS. 6 and 7 are perspective views of belt piercing screws with a different contacts, respectively, connected therewith.

The screws at each end of the housing which engage the outermost cords of the elevator belt pass through contacts 18 similar to that shown in FIG. 6. The contacts at the outer edges of the housing serve as signal contacts which are connected with a monitoring device 22. The monitoring device delivers an electrical input signal to the contact $18_{in}$ and screw at one edge of the belt and receives a return signal from the contact $18_{out}$ and screw at the other edge of the belt. The return signal is analyzed in a known manner by the monitoring device and any variations in the return signal from the input signal provides an indication of the condition of the cords. The analyzed signal thus provides an indication of any deterioration of the cords.

Figure 7:
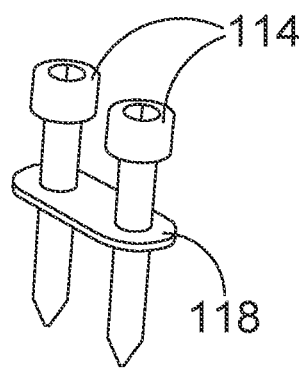

Turning now to FIGS. 7 and 12-15, a second embodiment of the invention will be described. As in the first embodiment, the elevator belt monitoring apparatus 102 includes a housing including a top portion 104 removably connected with a bottom portion 106. The bottom portion contains a plurality of openings 116 arranged in an array to receive a plurality of screws 112 which are configured to pierce cords 12 contained in an elevator belt 10. The housing bottom portion further contains a through slot 108 which receives the elevator belt. In the second embodiment, the bridge contacts are not arranged in the housing top portion as in the first embodiment. Rather, they are arranged on an upper surface 104a of the housing bottom portion. As shown in FIG. 7, the bridge contacts 118 have a planar configuration and preferably contain two openings, each of which is aligned with a respective housing opening for receiving a screw 114. The paired screws joined by a bridge contact 118 preferably pierce adjacent cords. The end contacts have an L-shaped configuration, the same as shown in FIG. 6. These end contacts serve as input and output signal contacts which are connected with a monitoring device 22 in the same manner as the input and output contacts in the first embodiment.

Figure 15:
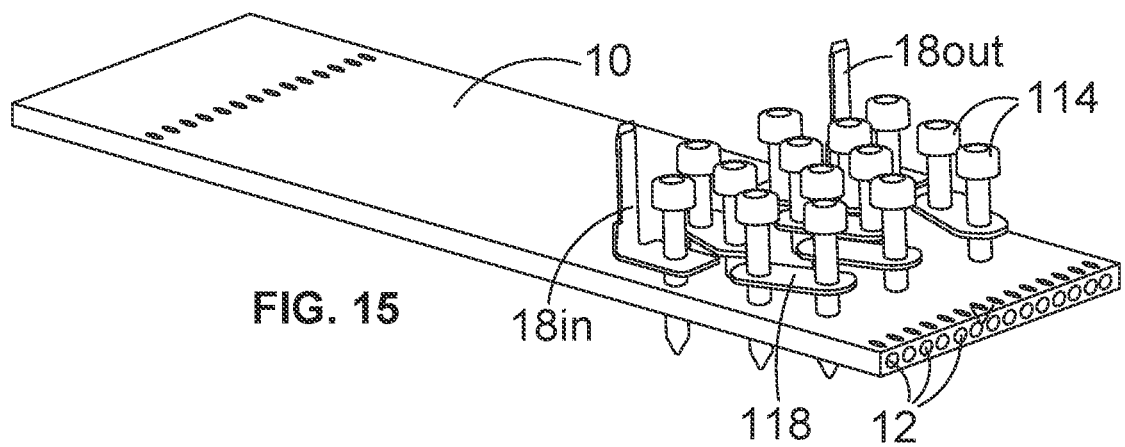
FIGS. 15 and 16 are front and top perspective views, respectively, of the piercing screws and bridge and signal contacts with the housing portions removed for the monitoring apparatus of FIG. 12.
Figure 16:
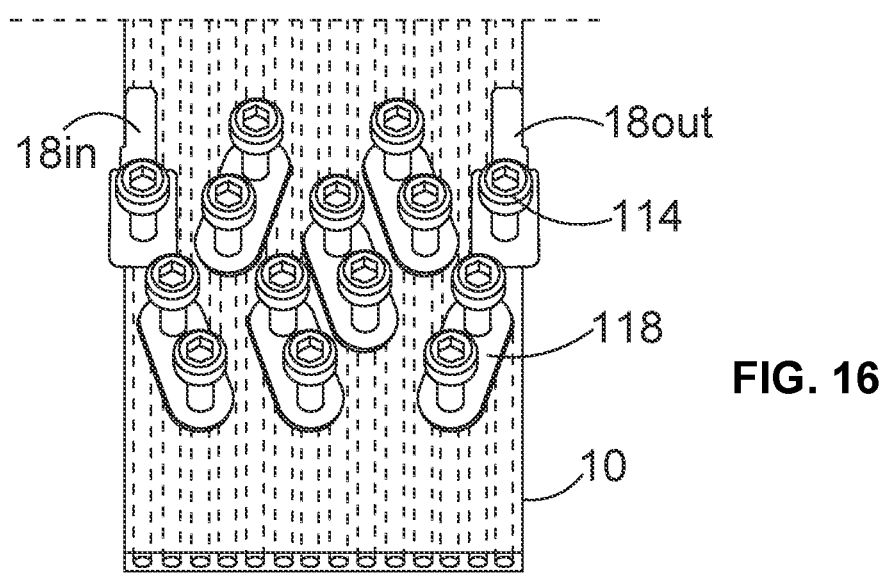

The top portion 104 of the housing contains a plurality of through openings 126 which are aligned with the openings 116 in the housing bottom portion. The through-openings 126 provide access openings for a screwdriver which is used to turn the screws 114 and drive them into piercing contact with respective cords of the belt. As the screws are driven into the belt, the bridge contacts 118 and the planar portions 18a of the contacts 18 are pressed against the top surface 104a of the housing bottom portion, with the screws passing through the openings in the respective contacts. It will be readily apparent that the diameter of the contact openings corresponds with the outer diameter of the threaded portion of the screws with sufficient tolerance that the screws may pass through the openings. Once assembled, the piercing screws 114 are arranged in an array as shown in FIGS. 15 and 16 with each screw piercing a respective cord.

Figure 17:
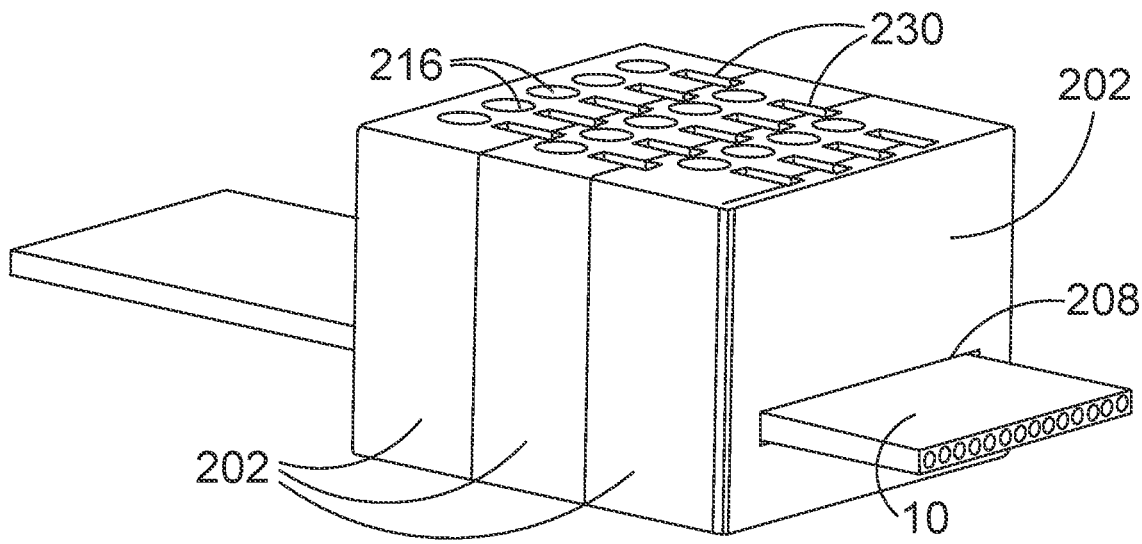
FIGS. 17 and 18 are a front perspective and top plan views, respectively, of an elevator belt monitoring apparatus according to a third embodiment of the invention.
Figure 18:
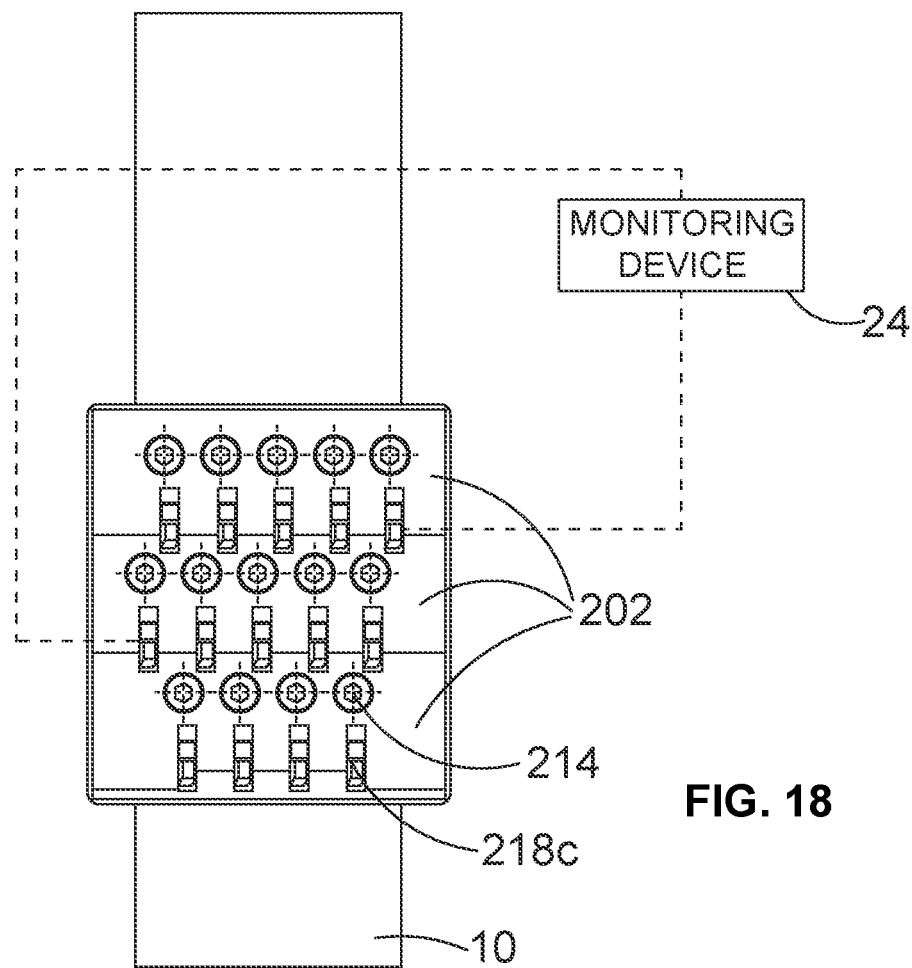
Figure 19:
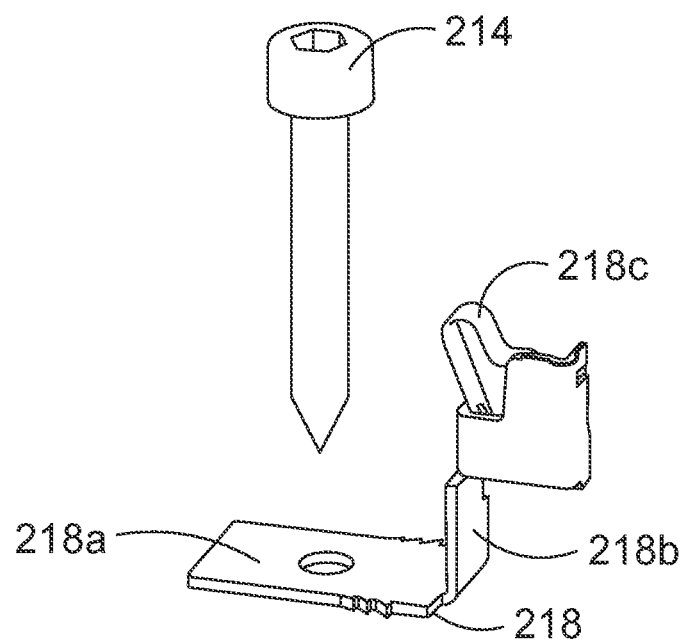
FIG. 19 is an exploded perspective view of a piercing screw and contact having a wire clip according to the monitoring apparatus of FIG. 15.
Figure 20:
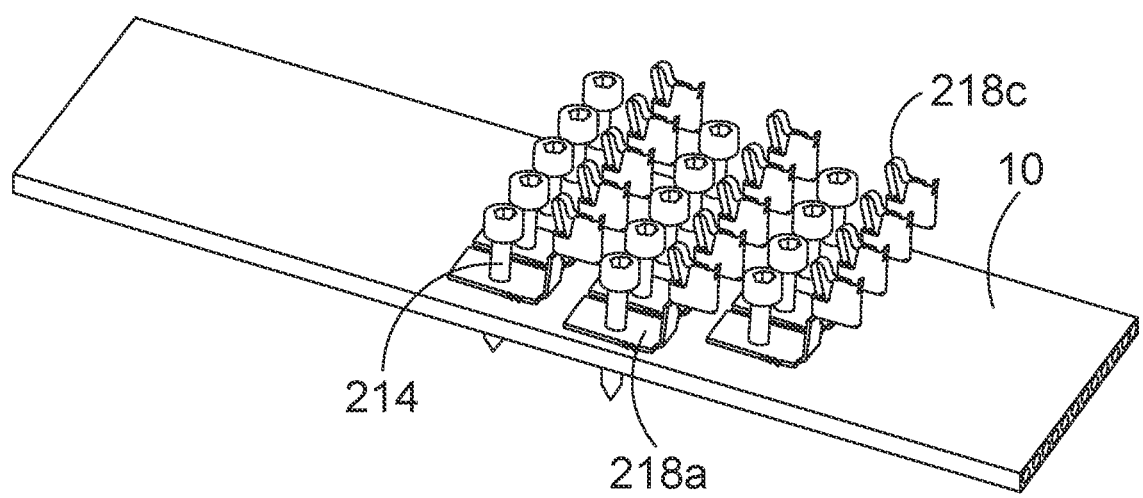
FIG. 20 is a top perspective view of the piercing screws and contacts with the housing portions removed of the monitoring apparatus of FIG. 15.
Figure 21:
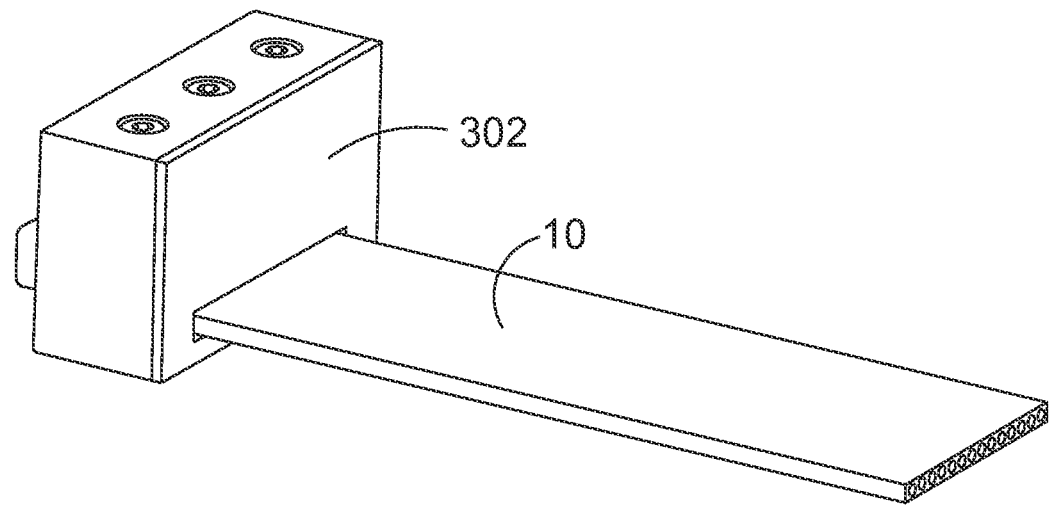
FIG. 21 is a front perspective view of an elevator belt monitoring apparatus according to a fourth embodiment of the invention.
Figure 22:
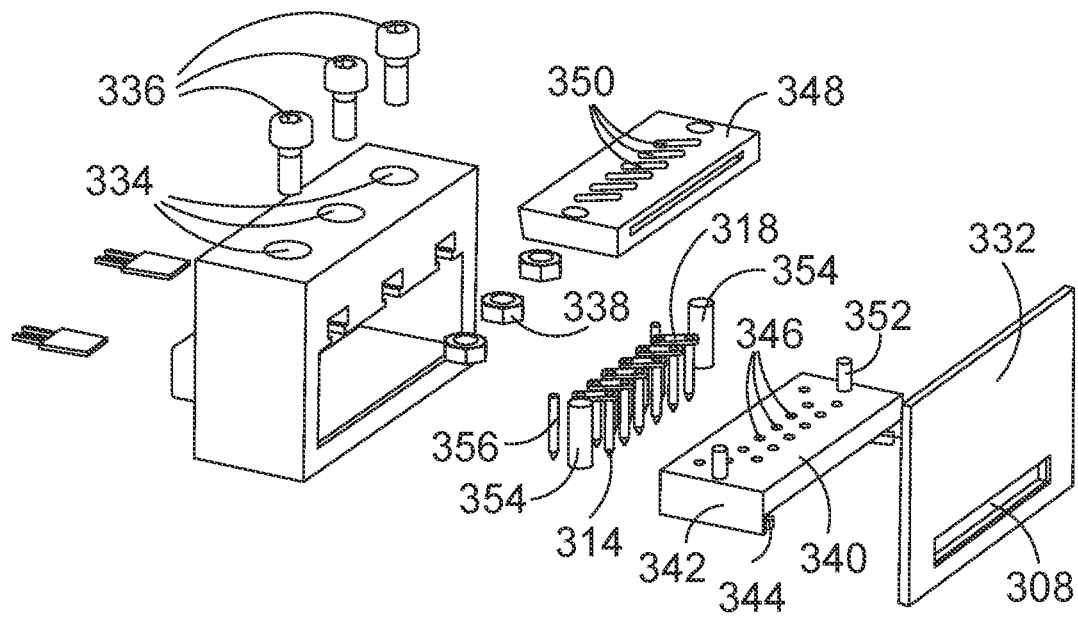
FIG. 22 is an exploded perspective view of the monitoring apparatus of FIG. 21 without the elevator belt.

A third embodiment of the invention is shown in FIGS. 17-20. In this embodiment, the housing 202 is formed as a unitary structure without separate top and bottom portions as in the first and second embodiments. However, a series of adjoining housings may be provided as shown in FIG. 17. The housing or housings contain a through slot 208 which receives the elevator belt 10. The housings contain openings 216 configured in an array for receiving piercing screws 214 similar to those of the first and second embodiments which are operable by a screwdriver accessible via the openings to pierce the cords of the elevator belt 10. A characterizing feature of the third embodiment is the configuration of the contact 218 which is shown in detail in FIG. 19. Each contact includes a planar portion 218a containing an opening for receiving a screw 214. A second portion 218b of the contact extends normal to the planar portion. The second portion includes a spring clip 218c configured to receive and retain a wire. The wire may be a bridge wire to connect adjacent contacts and screws or a signal wire to connect the screws and contacts at opposite edges of the elevator belt with a monitoring device 24 to transmit and deliver input and output signals between the end contacts and screws and the monitoring device. Each housing further contains additional openings 230 aligned with the spring clips 218c to afford access to the spring clips and operate the clips to clamp or release a wire.

A fourth embodiment of the elevator belt monitoring apparatus according to the invention will be described with reference to FIGS. 22-28. In this embodiment, a piercing pin 314 serves as the belt-piercing device.

A housing 302 includes a cover 332 which contains a longitudinal through slot 308 for receiving the elevator belt 10. The housing contains a plurality of openings 334 in which screws or bolts 336 are arranged. A series of nuts 338 are arranged in slots at the bottom of the screw openings 334 to receive and retain a bottom portion of the screws, respectively. Arranged within a lower portion of the housing behind the slot in the cover 332 is a belt holding plate 340. The plate includes side walls 342 depending from opposite side edges thereof to define a channel which receives and retains the elevator belt 10. The inner surfaces of the side walls include resilient members 344 which have a limited degree of flexure which press against the side edges of the elevator belt to center the belt within the belt holding plate. The plate further includes an array of through openings 346 which are offset from one another so that each opening is arranged above a cord within the elevator belt.

A pin holding plate 348 is arranged within the housing beneath the screws 336 and above the belt holding plate 340. The pin holding plate contains a series of spaced angular through slots 350 each of which is configured to receive a pair of piercing pins 314. The pointed lower ends of the pins are aligned with the openings 346 of the belt holding plate 340. The upper surface of the belt holding plate contains a pair of spaced projections or studs 352 at the side ends thereof. A pair of springs 354 are mounted on the studs and thus are arranged between the pin holding plate 348 and the belt holding plate 340.

As shown in FIG. 26, pairs of pins 314 are joined by a bridge contact 318. The pairs are arranged in the slots 350 of the pin holding plate 348.

Figure 23:
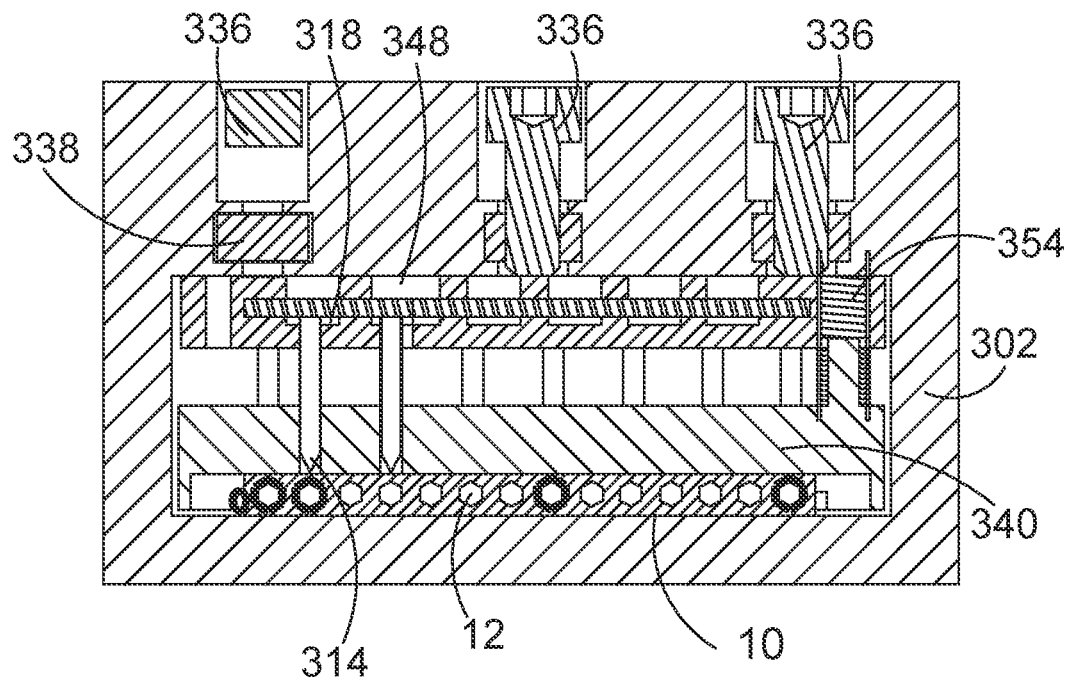
FIGS. 23 and 24 are front sectional views of the monitoring apparatus of FIG. 21 showing piercing pins in a first position in which the pins are not engaged with the cords of an elevator belt and a second position where the pins pierce the cords of an elevator belt, respectively.
Figure 24:
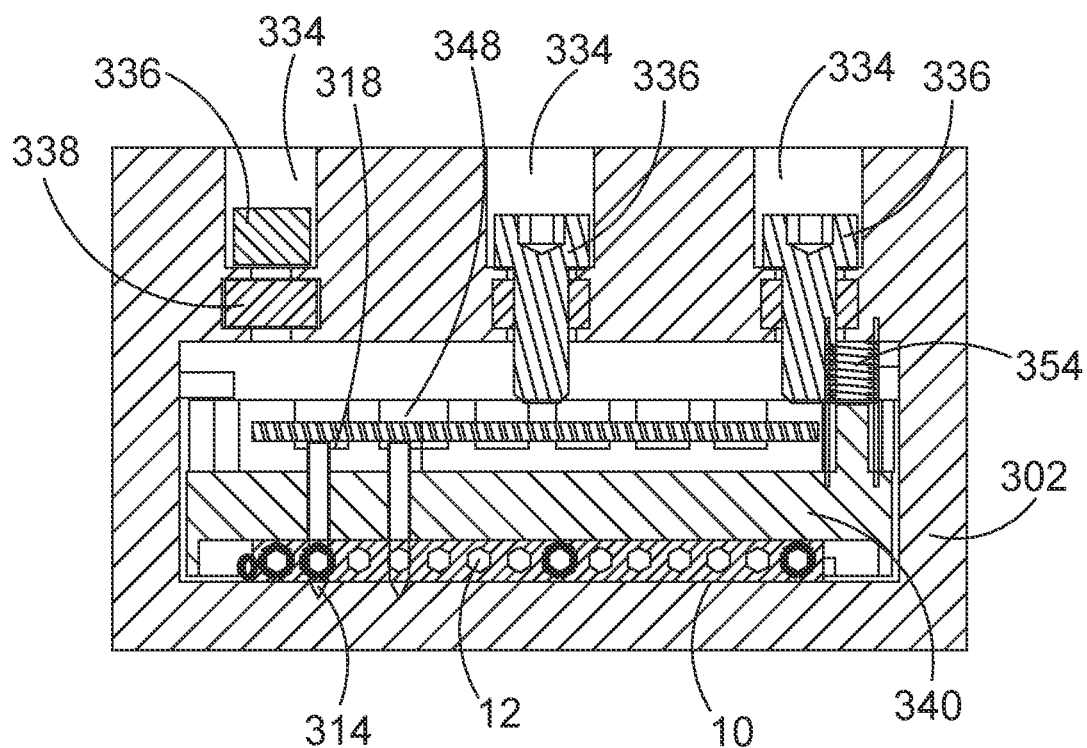

When the housing is assembled with the belt 10 in the belt holding plate 340, the pins 314 in the pin holding plate, and the screws in the openings 334 with the bottoms threadably engaged with respective nuts as shown in FIG. 23, the housing is operable to insert the pins into engagement with the elevator belt cords. That is, the screws 336 are rotated, either in synchronization or intermittently successively to press the pin holding plate 348 against the bias force of the springs 354 toward the belt holding plate 340. As the pin holding plate is displaced, the pins are simultaneously driven through and guided by the openings 348 of the belt holding plate into the belt and through the cords as shown in FIGS. 24 and 25. Each pin engages a different cord.

Figure 28:
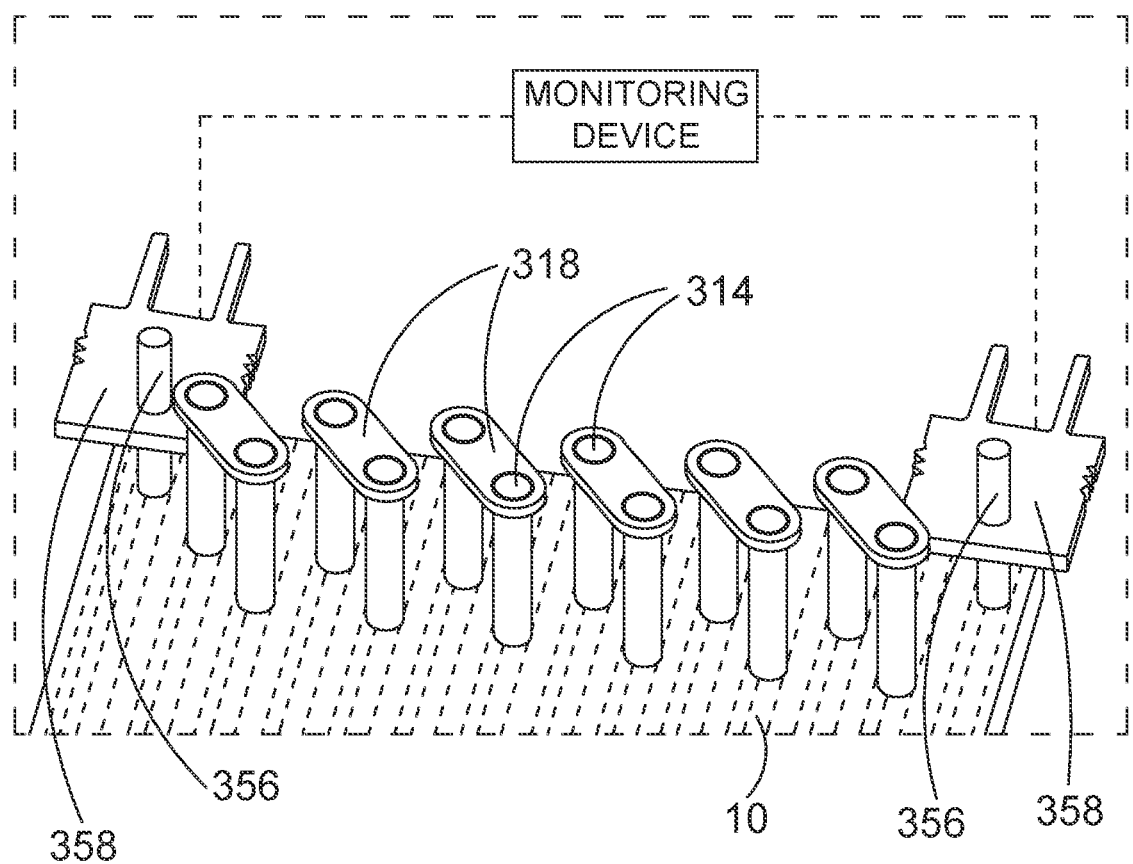
FIG. 28 is a top perspective view of the piercing pins and contacts with the housing portions removed of the monitoring apparatus of FIG. 21.

FIGS. 27 and 28 illustrate a combination of a pin 356 and a signal contact 358. The pins 356 are arranged to engage the outermost cords of the belt and the signal contacts 358 are connected with a monitoring device 22 to deliver the input and output signals therebetween. The end pins 356 are driven into the end cords by the pin holding plate. The screw and pin holding plate cooperate as an actuating mechanism to insert the pins into contact with the cords.

While the preferred forms and embodiments of the invention have been illustrated and described, it will be apparent to those of ordinary skill in the art that various changes and modifications may be made without deviating from the inventive concepts set forth above.

What is claimed is:

1. An elevator belt monitoring system, comprising
   (a) a housing including a bottom portion configured to receive a portion of an elevator belt arranged in a plane and containing an array of parallel cords and a top portion removably connected with said housing bottom portion, said housing bottom portion containing a plurality of openings arranged in an array aligned with the array of parallel cords, respectively, said plurality of openings having parallel axes arranged normal to said plane containing the array of parallel cords;
   (b) a plurality of parallel belt-piercing devices arranged within said plurality of openings, respectively, each belt-piercing device in the plurality of parallel belt-piercing devices comprising a screw configured for guidance by and displacement within a respective opening of the plurality of openings along a respective opening axis to pierce a respective cord within the elevator belt when said screw is driven by a driving device; and
   (c) a plurality of contacts connected with said plurality of parallel belt-piercing devices, said plurality of contacts including a pair of signal contacts and a plurality of bridge contact assemblies, said plurality of bridge contact assemblies connecting selected pairs of belt-piercing devices from the plurality of parallel belt-piercing devices.

2. The elevator belt monitoring system as defined in claim 1, wherein said plurality of bridge contact assemblies each have a planar portion which extends normal to said plurality of parallel belt-piercing devices.

3. The elevator belt monitoring system as defined in claim 1, wherein said plurality of bridge contact assemblies include first bridge contacts arranged in said housing bottom portion in engagement with each screw and second bridge contacts arranged in said housing top portion, said first and second bridge contacts each including a connection portion which extends normal to a planar portion, respectively, whereby when said housing top and bottom portions are connected, said first and second bridge contacts are also connected to electrically connect a selected pairs of screws.

4. The elevator belt monitoring system as defined in claim 1, wherein said plurality of bridge contact assemblies include bridge contacts arranged in said housing bottom portion which are connected between a selected pairs of screws.

5. The elevator belt monitoring system as defined in claim 1, wherein said housing top portion contains a plurality of openings arranged in an array corresponding with said array of openings in said housing bottom portion to receive the screwdriver, said bridge contact assemblies being arranged on an upper surface of said housing bottom portion.

6. The elevator belt monitoring system as defined in claim 5, wherein said pair of signal contacts each include a planar portion containing an opening which receives a screw and a connection portion which extends normal to said planar portion.

7. The elevator belt monitoring system as defined in claim 6, wherein each of a respective screw of said pair of signal contacts are configured to engage the array of parallel cords of the elevator belt at opposite edges of the elevator belt.

8. The elevator belt monitoring system as defined in claim 7, further comprising a monitoring device connected with said pair of signal contacts for delivering an electrical signal to each of a respective screw of said pair of signal contacts and processing a return signal from each of a respective screw of said pair of signal contacts to indicate a condition of the the array of parallel cords.

9. The elevator belt monitoring system as defined in claim 1, wherein at least one of said plurality of bridge contact assemblies and said pair of signal contacts includes a planar portion containing an opening which receives a screw and a connection portion which extends normal to said planar portion, said connection portion including a resilient spring clip for connection with a wire.

10. An elevator belt monitoring system, comprising
  (a) a housing for receiving a portion of an elevator belt containing an array of parallel cords;
  (b) a belt holding plate arranged in said housing, said belt holding plate retaining the array of parallel cords in a plane and containing an array of openings aligned with the array of parallel cords, respectively, said array of openings having parallel axes arranged normal to said plane containing the array of parallel cords;
  (c) a plurality of parallel pins arranged within said housing, each pin in the plurality of parallel pins being configured for guidance through a respective opening of the array of openings in said belt holding plate along said opening axis to pierce a respective cord of the parallel cords within the elevator belt; and
  (d) a plurality of contacts connected with said plurality of parallel pins, said plurality of contacts including a pair of signal contacts and a plurality of bridge contacts, wherein said plurality of bridge and pair of signal contacts each contain an opening for receiving a pin from the plurality of parallel pins and each of said plurality of bridge contacts connects selected pairs of pins from the plurality of parallel pins.

11. The elevator belt monitoring system as defined in claim 10, and further comprising a pin holding plate arranged in said housing above said belt holding plate, said pin holding plate containing a plurality of spaced parallel through slots each of which contains said selected pairs of pins from the plurality of parallel pins.

12. The elevator belt monitoring system as defined in claim 11, wherein said pin holding plate further contains a pair of through openings in opposite ends of said plate for receiving end pins from the plurality of parallel pins configured to pierce the cords from the array of parallel cords at opposite ends of the elevator belt.

13. The elevator belt monitoring system as defined in claim 12, wherein said signal contacts are connected with said end pins from the plurality of parallel pins.

14. The elevator belt monitoring system as defined in claim 13, and further comprising a monitoring device connected with said signal contacts for delivering an electrical signal to said pins from the plurality of parallel pins and processing a return signal from said pins from the plurality of parallel pins to indicate a condition of the elevator cords from the array of parallel cords.

15. The elevator belt monitoring system as defined in claim 11, and further comprising an actuator mechanism arranged within said housing above said pin holding plate, said actuator mechanism being operable to displace said pin holding plate and said pins from the plurality of parallel pins against said elevator belt and to drive said pins into engagement with the cords from the array of parallel cords, respectively.

16. The elevator belt monitoring system as defined in claim 15, wherein said actuator mechanism comprises at least one screw connected with said housing, an end of said screw engaging said pin holding plate, whereby as said screw is rotated relative to said housing, said screw presses said pin holding plate toward the elevator belt.

17. The elevator belt monitoring system as defined in claim 15, wherein said belt holding plate openings have a diameter corresponding with an outer diameter of said pins, whereby said pins from the plurality of parallel pins pass through said belt holding plate and into the elevator belt to pierce said cords from the array of parallel cords upon operation of said actuator mechanism.

18. The elevator belt monitoring system as defined in claim 17, wherein said belt holding plate includes a pair of side walls extending normal to said belt holding plate to define a channel for receiving the elevator belt.

19. The elevator belt monitoring system as defined in claim 18, wherein said belt holding plate side walls include inwardly extending resilient members which press against edge portions of the elevator belt to position the elevator belt within said housing with each of said pins from the plurality of parallel pins in alignment with one of the cords from the array of parallel cords, respectively, within the elevator belt.

20. A contact assembly for an elevator belt monitoring system, comprising
  (a) a belt-piercing device configured to penetrate a cord within a portion of an elevator belt arranged in a plane;
  (b) a guide assembly containing a through-opening for receiving and guiding a belt-piercing device along an axis of said through-opening arranged normal to the plane through the elevator belt into contact with the cord; and
  (c) a contact connected with said belt-piercing device, said contact having one of a planar and L-shaped configuration.

21. The contact assembly as defined in claim 20, wherein said contact contains an opening aligned with said axis of said through-opening for receiving said belt-piercing device.

22. The contact assembly as defined in claim 21, wherein said belt-piercing device comprises one of a screw and a pin.

23. The contact assembly as defined in claim 22, wherein said contact is configured to connect a selected pair of belt-piercing devices.

24. The contact assembly as defined in claim 23, wherein said L-shaped contact comprises a signal contact and includes a first planar portion containing said opening for said belt-piercing device and a contact second portion for connection with an elevator belt monitoring device.

25. The contact assembly as defined in claim 24, wherein said contact second portion includes a resilient spring clip for connection with a wire.

\* \* \* \* \*